US005973279A

United States Patent [19]

Turner et al.

[11] Patent Number: 5,973,279

[45] Date of Patent: Oct. 26, 1999

[54] STABILIZER FOR A CIRCUIT BREAKER HANDLE MECHANISM

[75] Inventors: David C. Turner, Imperial; Craig J. Puhalla, Coraopolis; Eric V. Eiselt, Aliquippa, all of Pa.

[73] Assignee: Eaton Corporation, Cleveland, Ohio

[21] Appl. No.: 08/989,592

[22] Filed: Dec. 12, 1997

[51] Int. Cl.[6] ................................ F16C 1/12; H01H 3/02

[52] U.S. Cl. ............................................ 200/331; 200/337

[58] Field of Search .................................... 200/331, 337, 200/338

[56] References Cited

U.S. PATENT DOCUMENTS

| | | | |
|---|---|---|---|
| 2,418,006 | 3/1947 | Bangert, Jr. | 200/337 X |
| 3,939,725 | 2/1976 | Fisher | 200/331 X |
| 4,626,638 | 12/1986 | Samples et al. | 200/331 |
| 4,679,018 | 7/1987 | McKee et al. | 335/167 |
| 5,319,168 | 6/1994 | Hutko et al. | 200/331 |
| 5,422,453 | 6/1995 | Smith et al. | 200/329 |
| 5,428,196 | 6/1995 | Beatty, Jr. et al. | 200/329 |
| 5,493,084 | 2/1996 | Whitaker et al. | 200/50 |

OTHER PUBLICATIONS

Eaton Publication SA–12–092 Jul. 94/TLG1043 Flex Shaft™Flange Mounted Handle Mechanism.

Westinghouse Series C®M–Frame External Accessories 29–120 Jan. 1995.

*Primary Examiner*—Renee S. Luebke

*Attorney, Agent, or Firm*—Martin J. Moran

[57] ABSTRACT

A switching mechanism interfaces a flexible shaft to the handle of a circuit interrupter which handle is rotated in a arcuate path between an on position and an off position. The switching mechanism includes a handle attachment for rotating between the on position and off position. The switching mechanism includes a base plate which is attached to the circuit interrupter and secures a flexible shaft thereto. The other end of the flexible shaft is connected to a remote, exteriorly mounted operating handle. The base plate has a perpendicularly extended tab with ears thereon which feeds through an opening in a portion of the linearly moving part of the handle mechanism actuator. Since the present apparatus is to be disposed on the side of the circuit breaker, there is a likelihood for sideways twisting or torsional rotation of the yoke in the direction perpendicular to the plane in which the arc of the handle of the circuit breaker is to move during opening and closing operations. The presence of the tab which captures the actuating mechanism between the ears thereof and the flat surface of the base prevents or greatly minimizes sideways twisting, torsion or rotation during the operation of the handle mechanism.

6 Claims, 4 Drawing Sheets

STABILIZER FOR A CIRCUIT BREAKER HANDLE MECHANISM

BACKGROUND OF THE INVENTION

1. Field of the Invention

This invention is directed to an interface between a flexible shaft and circuit interrupting device and more particularly to such an interface between a linearly moving rod of the flexible shaft and a rotary mechanism which interacts with the handle of the circuit breaker.

2. Description of the Prior Art

Molded case circuit breakers are well known in the art. Examples of such circuit breakers are disclosed in U.S. Pat. No. 4,679,018, for instance. Such circuit breakers are used to protect electrical circuitry from damaged due to an overcurrent condition. Molded case circuit breakers include a pair of separable contacts, which may be operated either manually by way of a handle disposed on the outside of the case or automatically in response to an overcurrent condition.

For a variety of reasons, such as operator safety, for example, circuit interrupters are often mounted behind a panel cover or behind a door in a cabinet. Typically, in these installations, the handles of the circuit interrupters are not directly accessible without opening the cover or door. In some of these installations a remote handle mechanism is mounted on or near the opposite side or exterior of the panel or door and a mechanical linkage is used to interconnect the remote handle mechanism with the circuit interrupter handle. Examples of such mechanisms can be found in U.S. Pat. No. 5,493,084 assigned to the assignee of the present invention entitled "Door Release for Circuit Interrupter Rotary Handle Mechanism". In this case there is a relatively ridged linkage between the circuit interrupter handle the remotely mounted handled. Another example maybe found in U.S. Pat. No. 5,422,453 which teaches an actuator for displacing the toggle or handle of a circuit interrupter, in particularly this includes a pair of space, abutment surfaces for bearing against the handle along an arcuate path coincident with the motion of the handle. Still a third example may be found in U.S. Pat. No. 5,428,196 entitled "Flexible Shaft Interface for Circuit Interrupter" also assigned to the same assignee as the present application. Here is taught a interface between an flexible shaft and a circuit interrupting device and more particularly to an interface between a linearly movable rod of the flexible shaft and the handle of the circuit breaker. Reference may also be made to Eaton publication SA12092 July 94-TLG1043 entitled, "Flex Shaft™ Flange Mounted Handle Mechanism". Still another example maybe found in a publication entitled, "Westinghouse Series C® M-Frame External Accessories" 29-120M January, 1995. In the latter three examples a flexible cable is provided between the external handle and the circuit breaker handle. This is advantageous for allowing easy disposal of the circuit breaker on the inside of the cabinet. Since there are no ridged interconnections between the external handle and the circuit breaker handle a broad range of locations is possible inside of the circuit breaker cabinet for placement of the circuit interrupter.

Referring now to the drawings and FIG. 1 in particular, a prior art circuit interrupter system of the kind having a circuit interrupter disposed within a cabinet and a remote, exteriorly mounted operating handle with intermediate sheathed drive or two-piece cable is depicted. In particular there is provided a cabinet 10 having a back wall 12 and front wall or door 14. A remote operator handle 16 is provided on the front wall or door 14, which is interconnected by way of a sheathed, flexible cable 18 to a circuit breaker 20 mounted on the back wall 12. A transfer mechanism 22 is provided on the generally flat front face of the circuit breaker or interrupter 20. It includes a fixed base plate 24, which is attached to the front of the breaker 20 and sliding movable part 26, which is interconnected with the inner drive member of the cable 18. The breaker handled is captured in the movable part 26, so that as the operating handle 16 on the front wall is actuated to either open or close the circuit breaker, the drive member of the cable 18 moves the movable part 26 of the transfer mechanism 22 to cause the breaker or circuit interrupter handle 28 to move to open or close the circuit breaker separable main contacts as required.

Although the foregoing have many advantages, they do have certain disadvantages. One disadvantage lays in the fact that all of the mechanisms taught for interconnecting a flexible cable between an external handle and the internal handle of the circuit breaker rely upon centrally locating the cable interface on the front of the circuit breaker. Although this has the advantage of placing the longitudinally moving drive member of the cable immediately over the handle so as to reduce lateral torsion, it generally takes up significant cabinet space. It would be advantageous, if a means could be found for mounting a significant portion of the interface on the side of the circuit breaker thus freeing up more space in front of the face of the circuit breaker. But this will eliminate or greatly reduce the effect of sideways torsion on the handle which is usual for such an arrangement.

SUMMARY OF THE INVENTION

This and other needs of the circuit breaker are satisfied by the present invention, in particular, a circuit interrupter system of the kind having a circuit interrupter disposed within a cabinet with a face mounted circuit interrupter handle movable between open and closed positioned to open and close separable main contacts of the circuit breaker is taught. An operating handle disposed on the exterior of the cabinet is interconnected by way of cable to the circuit interrupter handle to actuate the circuit interrupter handle to open and close the separable main contacts. There is provided a circuit interrupter handle actuating device mounted on an actuator based plate. The circuit interrupter handle actuating device is rotationally movable in a first plane for causing the circuit interrupter handle to move as the drive member of the cable is moved linearly or translationally. There is provided on the actuator base a limiting means for generally preventing, within limits, the rotational or twisting movement of the circuit interrupter handle in a second plane which is perpendicular to the first plane. In an preferred embodiment this latter limit means includes a sliding surface and a protruding tab means with an ear or ears. A part of the handle actuating device slides against the sliding surface during an opening operation for the circuit interrupter and is prevented from sideways movement by the presence of the sliding surface and slides against the underside of the ear or ears during closing operation of the circuit interrupter and is prevented from sideways movement by the presence of the ear.

BRIEF DESCRIPTION OF THE DRAWINGS

These and other features of the invention maybe found in the included drawings in which.

DESCRIPTION OF THE PREFERRED EMBODIMENT

Figure 1:
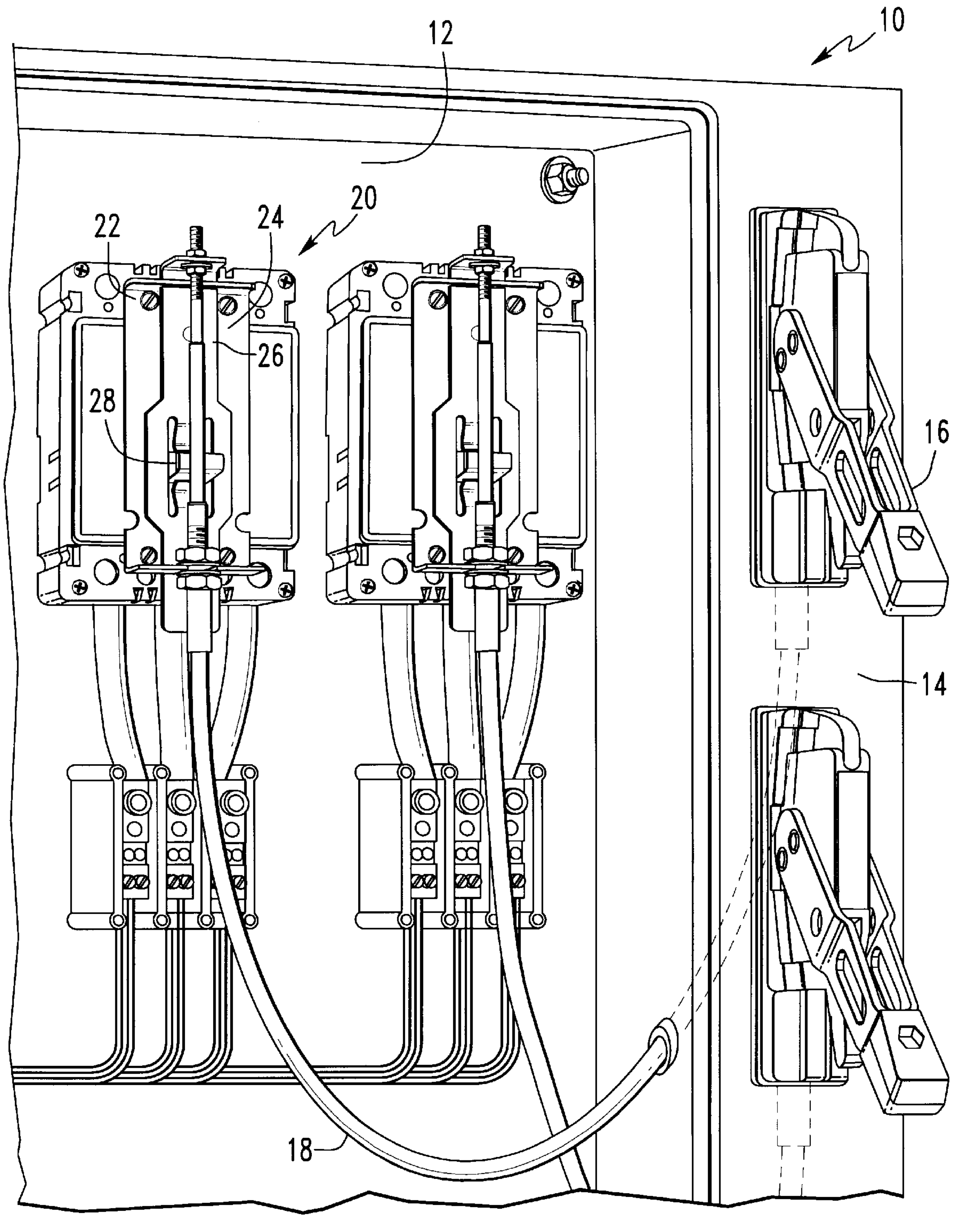
FIG. 1 PRIOR ART
FIG. 1 shows a prior art circuit interrupter system.
Figure 2:
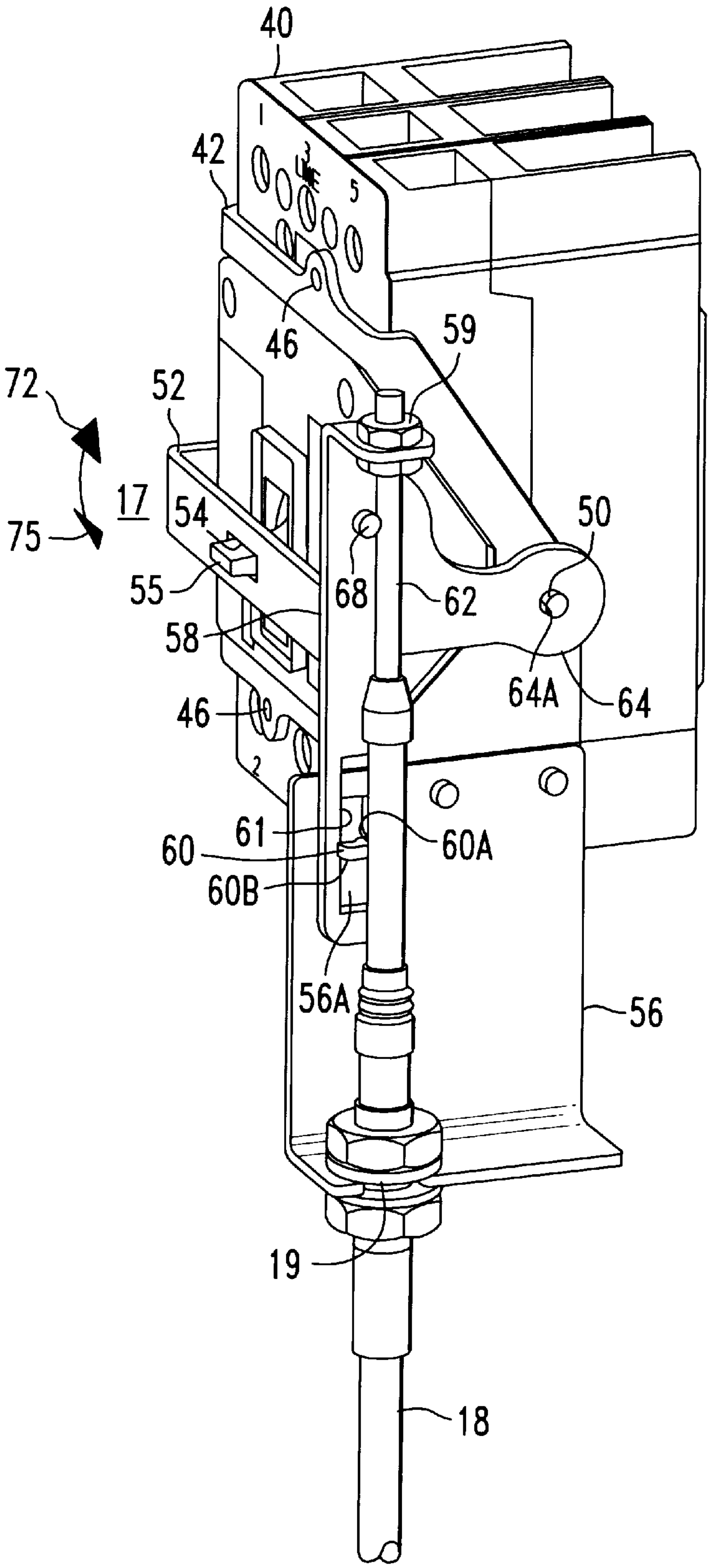
FIG. 2 shows an orthogonal view of the circuit interrupter handle actuating mechanism of the present invention disposed upon a molded case circuit breaker.
Figure 3:
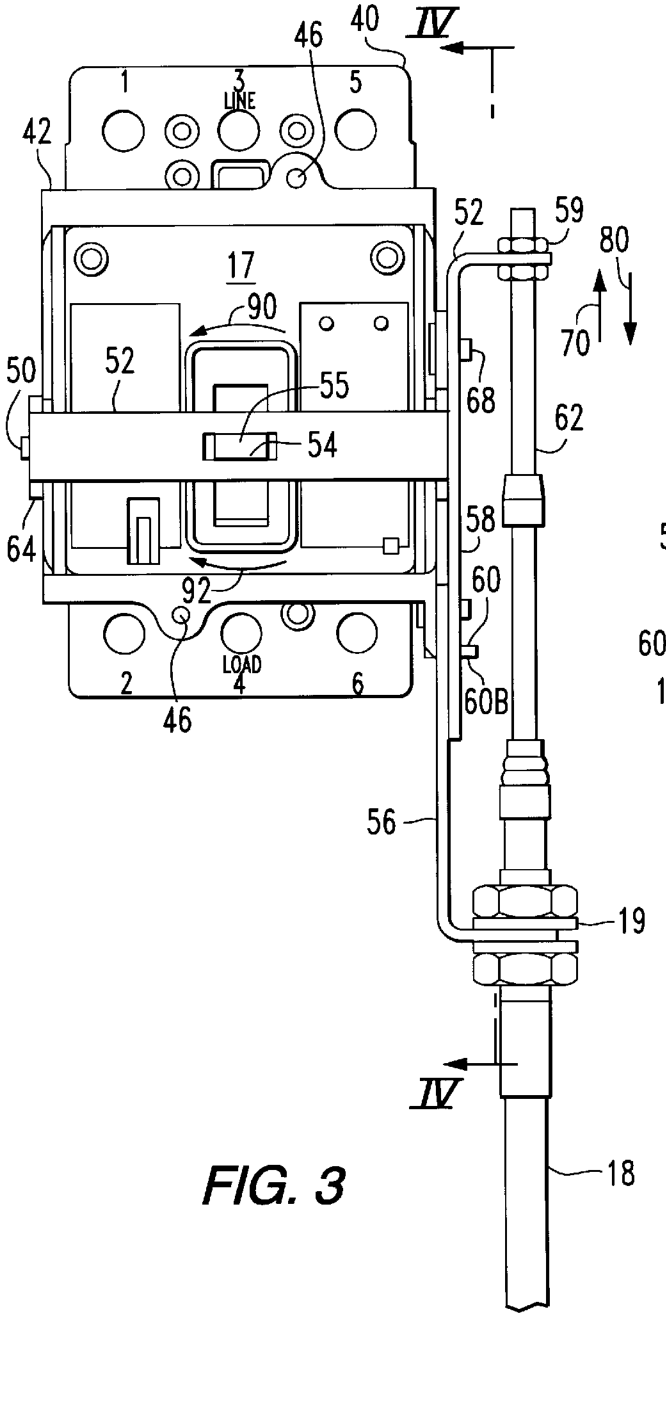
FIG. 3 shows a top plane view of the apparatus of FIG. 2.
Figure 4:
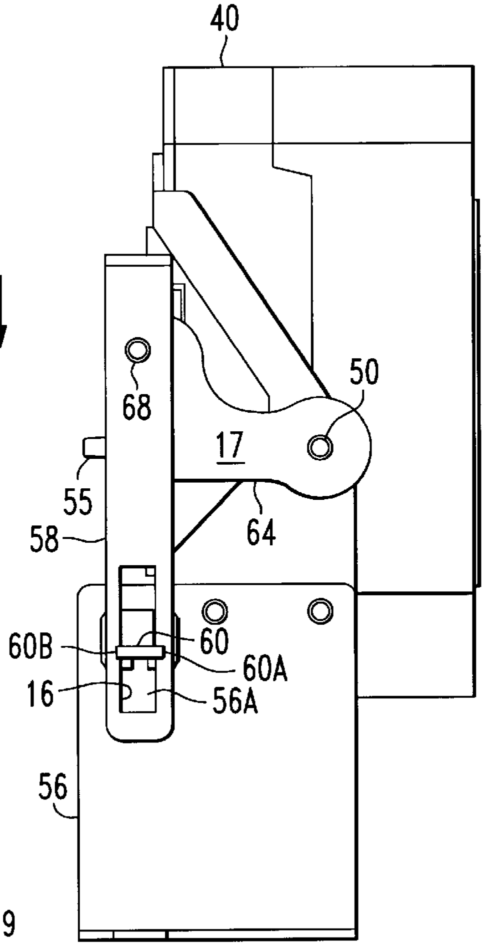
FIG. 4 shows a side elevation view of the apparatus of FIG. 3 shown along the section lines IV—IV of FIG. 3.

Referring now to FIGS. 2, 3 and 4 an embodiment of the present invention is shown. In particular there is provided a circuit breaker or circuit interrupter 40, which may be of the kind described in U.S. Pat. No. 5,418,196, which is incorporated herein by reference. Circuit breaker 40 may be mounted to the inside back of a cabinet in the manner described with respect to the prior art of FIG. 1. There is provided a flange or actuator base 42 which may be attached by way of screws disposed in screw holes 46 in the flange 42 to the relatively front face of the circuit breaker 40. There is also provided on either side of the flange pivotal nubs or axes 50 which support a yoke or circuit interrupter handle actuating member 52 having an opening 54 for capturing the handle 55 of the circuit breaker 40. There is also provided a bracket 56 having a protruding eared tab 60 with ears at 60A and 60B which is captured in slot 61. Slot 61 resides in a forward extension 58 of the yoke drive 52. The outer sheath of flexible cable 18 is affixed to the bracket 56 at the cable terminating device 19. Bracket 56 has a sliding surface 56A against which an inner portion of the extension 58 of the yoke drive 52 translates, slidingly abuts or slides with a slight component of rotation as the flexible relatively movable drive member, or central driving member 62 of the shaft 18 moves. The yoke 52 rotates in a first plane (parallel to extension 58 and parallel to the generally flat side of the circuit interrupter) on the axis of rotation or nub 50 which protrudes into a hole or opening 64A in a leg 64 of yoke drive 52. As the flexible end 62 of the shaft 18 translates in the direction 70 (as shown in FIG. 3), the extension 58 moves in the same direction which causes the yoke 52 to rotate on the yoke axis at 53 in arc direction 72, thus rotationally moving the circuit interrupter handle 55, which is trapped in the handle opening 54, to move the handle to close the circuit breaker main contacts. On the other hand, if drive end 62 is moved in the direction 80 (as shown in FIG. 3), extension 58 is translated or moved linearly and generally in the same direction causing the yoke 52 to rotate on the drive axis 53 in the rotational direction 75 to cause the captured circuit breaker handle 55, to rotate in the direction 75 to open the contacts of the circuit breaker 40. During movement in direction 70, the extension 58 bears against axis 68 causing attached yoke 52 to rotate around axis 50. Axis 68 is free to rotate in the opening in extension 58. Extension 58 is also free to slightly deflect toward the axis 50 because of the flexibility of cable 18. Just the opposite occurs when the movement is in direction 80.

By closely viewing FIG. 3 it can be seen that as the member 62 is translated in the direction 70, there is a tendency to twist or rotate the entire yoke 52 in the rotational direction 90 in a second plane which is parallel to the face of the circuit interrupter and perpendicular to the first plane. Both the first plane and second plane are parallel to a plane of the movement of circuit interrupter handle. On the other hand as the flexible member 62 is withdrawn in the direction 80, there is a tendency to twist or rotate the yoke 52 in the opposite rotational direction 92. To prevent this from happening or at least to minimize it, extension 58 is securely and snugly, slidingly trapped between the ears 60A and 60B protruding through the slot 61 and the sliding surface 56A. This forms a limiting device. Thus any tendency to rotate or twist yoke 52 in the direction 92 is offset by the surface 56A of the bracket 56 reacting against the inner side of the extension 58. On the other hand any tendency to move or twist the flange 42 in the rotational direction 90 is resisted by the extension 58 riding against the ears 60A and 60B of the tab 60.

Figure 5:
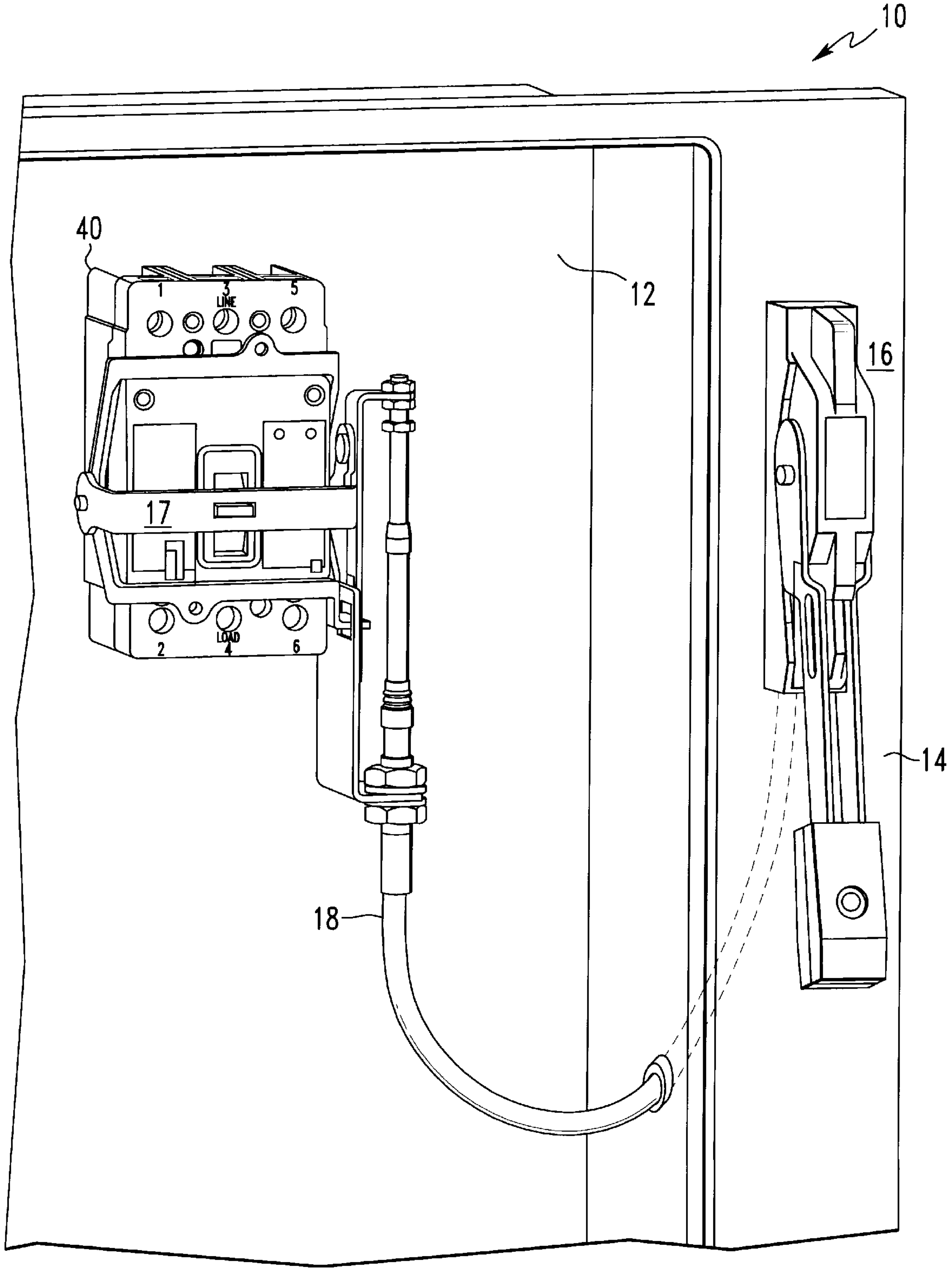
FIG. 5 shows an arrangement similar to the prior art arrangement of FIG. 1, but incorporating the teachings of the present invention.

Referring now to FIG. 5 an arrangement similar to that shown in FIG. 1, but replaced by the present embodiment of the invention is shown. In particular the same cabinet 10 is provided with the same operating handle 16 disposed on the same front or exterior wall 14 of cabinet 10 and interconnected with circuit breaker 40 by way of the flexible cable 18. In this case however, the mechanism 17 of FIGS. 2 through 4 is shown interconnected with breaker 40.

What we claim as our invention is:

1. A circuit interrupter system having a circuit interrupter disposed within a cabinet, said circuit interrupter having separable main contacts and a circuit interrupter handle movable between opened and closed positions to open and close the separable main contacts of the circuit interrupter, an operating handle disposed on the exterior of the cabinet and interconnected by way of a cable to the circuit interrupter handle to actuate the circuit interrupter handle to open and close the separable main contacts from the exterior of the cabinet, said cable having an outer sheath and a relatively movable inner drive member, comprising:

a circuit interrupter handle actuating means for interconnection with said circuit interrupter handle;

actuator base means disposed on the circuit interrupter for supporting said circuit interrupter handle actuating means;

cable terminating means disposed on said actuator base means for terminating said outer sheath, said movable inner drive member being interconnected with said circuit interrupter handle actuating means;

said circuit interrupter handle actuating means being rotationally movable in a first plane for causing said circuit interrupter handle to move as said movable inner drive member is moved translationally;

said actuator base means having a limiting means thereon for preventing rotational movement of said circuit interrupter handle actuating means in a second plane which is perpendicular to said first plane; and wherein said limiting means comprises a sliding surface and a protruding tab means with an ear, said circuit interrupter handle actuating means sliding against said sliding surface as said circuit interrupter handle opens or closes and sliding against an underside of said ear as said circuit interrupter handle closes or opens respectively to minimize said rotational movement of said circuit interrupter handle actuating means in said second plane.

2. The circuit interrupter system as claimed in claim 1, wherein said circuit interrupter handle actuating means has an opening therein through which said tab protrudes so that a portion of said circuit interrupter handle actuating means is slidingly trapped between said ear and said sliding surface.

3. A circuit interrupter system having a circuit interrupter disposed within a cabinet, said circuit interrupter having separable main contacts and an opening in a generally flat front face thereof through which a circuit interrupter handle movable between opened and closed positions to open and close the separable main contacts of the circuit interrupter protrudes, said circuit interrupter having a generally flat side which is generally perpendicular to said front face, an operating handle disposed on the exterior of the cabinet and interconnected by way of a two piece cable to the circuit interrupter handle to actuate the circuit interrupter handle to open and close the separable main contacts from the exterior of the cabinet, said cable having as a first piece an outer sheath and as a second piece a relatively movable inner drive member, comprising:

a circuit interrupter handle actuating means for interconnection with said circuit interrupter handle actuator base means disposed on the circuit interrupter front face for supporting said circuit interrupter handle actuating means;

cable terminating means disposed on said actuator base means for terminating said outer sheath, said movable inner drive member being interconnected with said circuit interrupter handle actuating means;

said circuit interrupter handle actuating means being rotationally movable in a plane parallel to the side of said circuit interrupter for causing said circuit interrupter handle to move as said relatively movable inner drive member is moved translationally; and said actuator base means having a limiting means thereon for preventing the rotational movement of said circuit interrupter handle actuating means in a second plane which is perpendicular to said first plane and parallel to said face of said circuit interrupter.

4. The circuit interrupter system as claimed in claim 3, wherein said limiting means comprises a sliding surface and a protruding tab means with an ear, said circuit interrupter handle actuating means sliding against said sliding surface during one of said circuit interrupter handle opening or closing operations and sliding against an underside of said ear during the other of said circuit interrupter handle opening or closing operations to minimize said rotational movement of said circuit interrupter handle actuating means in said second plane.

5. The circuit interrupter system as claimed in claim 4, wherein said circuit interrupter handle actuating means has an opening therein through which said tab protrudes so that a portion of said circuit interrupter handle actuating means is slidingly trapped between said ear and said sliding surface.

6. A circuit interrupter system having a circuit interrupter disposed within a cabinet, said circuit interrupter having separable main contacts and an opening in a generally flat front face thereof through which a circuit interrupter handle movable between opened and closed positions to open and close the separable main contacts of the circuit interrupter protrudes, said circuit interrupter having a generally flat side which is generally perpendicular to said front face, an operating handle disposed on the exterior of the cabinet and interconnected by way of a two piece flexible cable to the circuit interrupter handle to actuate the circuit interrupter handle to open and close the separable main contacts from the exterior of the cabinet, said flexible cable having as a first piece a fixed outer sheath and as a second piece a relatively movable inner drive member, comprising:

a circuit interrupter handle actuator interconnection with said circuit interrupter handle;

an actuator base disposed on the circuit interrupter front face and rotationally supporting said circuit interrupter handle actuator thereon;

a cable terminator disposed on said actuator base for terminating said fixed outer sheath, said relatively movable inner drive member being interconnected with said circuit interrupter handle actuator;

said circuit interrupter handle actuator being rotationally movable in a plane parallel to the side of said circuit interrupter for causing said circuit interrupter handle to move as said movable inner drive member is moved translationally;

said actuator base having a limiting tab protruding therefrom, said tab having an ear a portion of said circuit interrupter handle actuator being translationally movable as a consequence of said rotational movement of said circuit interrupter handle but said actuator base and said ear preventing the rotational movement of said circuit interrupter handle actuator in a second plane which is perpendicular to said first plane and parallel to said face of said circuit interrupter; and wherein sliding abutment of said handle actuator when moved in a first translational direction against said sliding surface minimizes said rotational movement if said circuit interrupter handle actuator in a first rotational direction in said second plane, and wherein sliding abutment of said handle actuator when moved in the opposite translational direction against said underside of said ear prevents said rotational movement of said circuit interrupter handle actuator in the opposite rotational direction in said second plane.

* * * * *